United States Patent [19]
Komistek et al.

[11] Patent Number: 5,837,152
[45] Date of Patent: Nov. 17, 1998

[54] INCLINED SEPARATION TANK

[75] Inventors: Stephen Michael Komistek; Clark Faulkner Walker, both of Alberta, Canada

[73] Assignee: Corlac Inc., Alberta, Canada

[21] Appl. No.: 827,700

[22] Filed: Apr. 9, 1997

[51] Int. Cl.[6] .................................................... C02F 1/40
[52] U.S. Cl. ...................... 210/801; 210/519; 210/522; 210/540
[58] Field of Search .................... 210/529, 521, 210/522, 538, 540, 800, 801

[56] References Cited

U.S. PATENT DOCUMENTS

| | | | |
|---|---|---|---|
| 909,733 | 1/1909 | Zobler | 210/519 |
| 1,494,670 | 5/1924 | Delaney et al. | 210/538 |
| 2,206,835 | 7/1940 | Combs . | |
| 2,375,590 | 5/1945 | Schonberg et al. | 210/521 |
| 2,422,555 | 6/1947 | Karlson et al. | 210/519 |
| 2,613,811 | 10/1952 | Archibald | 210/521 |
| 3,425,913 | 2/1969 | Holden | 210/521 |
| 4,115,279 | 9/1978 | Toft | 210/521 |
| 4,120,796 | 10/1978 | Huebner . | |
| 4,132,651 | 1/1979 | deJong . | |
| 4,257,895 | 3/1981 | Murdock | 210/521 |
| 4,604,196 | 8/1986 | Lowrie et al. | 210/540 |
| 4,939,817 | 7/1990 | Weber . | |
| 5,204,000 | 4/1993 | Steadman et al. | 210/519 |
| 5,326,474 | 7/1994 | Adams et al. . | |
| 5,414,776 | 5/1995 | Homan | 210/519 |

FOREIGN PATENT DOCUMENTS

| | | |
|---|---|---|
| 197 859 | 3/1920 | Canada . |
| 1 035 290 | 7/1978 | Canada . |
| 1 042 819 | 11/1978 | Canada . |
| 1 237 372 | 5/1988 | Canada . |
| 2 041 479 | 10/1992 | Canada . |
| 2 108 297 | 4/1995 | Canada . |
| 613769 | 7/1978 | Russian Federation . |

*Primary Examiner*—Christopher Upton
*Attorney, Agent, or Firm*—Shoemaker and Mattare, Ltd.

[57] ABSTRACT

A vessel designed to separate out clean water from produced oil is disclosed. Conventional free water knockout vessels (FWKO) are normally disposed horizontally, and have a large diameter. The large diameter maximizes the distances between the oil/water interface and the exit points on the vessel for the water and the emulsion. The larger the vertical distance from the oil/water interface, the greater the chance that the oil and water can be agitated by slugs of gas and fluids. Tilting the vessel and reducing the diameter minimizes the distance the fluid has to travel to reach the top and bottom walls of the vessel, maximizes the distances from the oil/water interface, utilizes more fluid space in the vessel, reduces agitation caused by gas slugs, and forces the water to travel a longer distance which provides more separation time. Emulsions in most pipelines stratify, and the inlet nozzle is designed in such a way that it encourages the stratification of oil and water to continue as it flows into the vessel. Baffles are also incorporated to maximize the retention time of clean water and emulsion in the vessel.

6 Claims, 1 Drawing Sheet

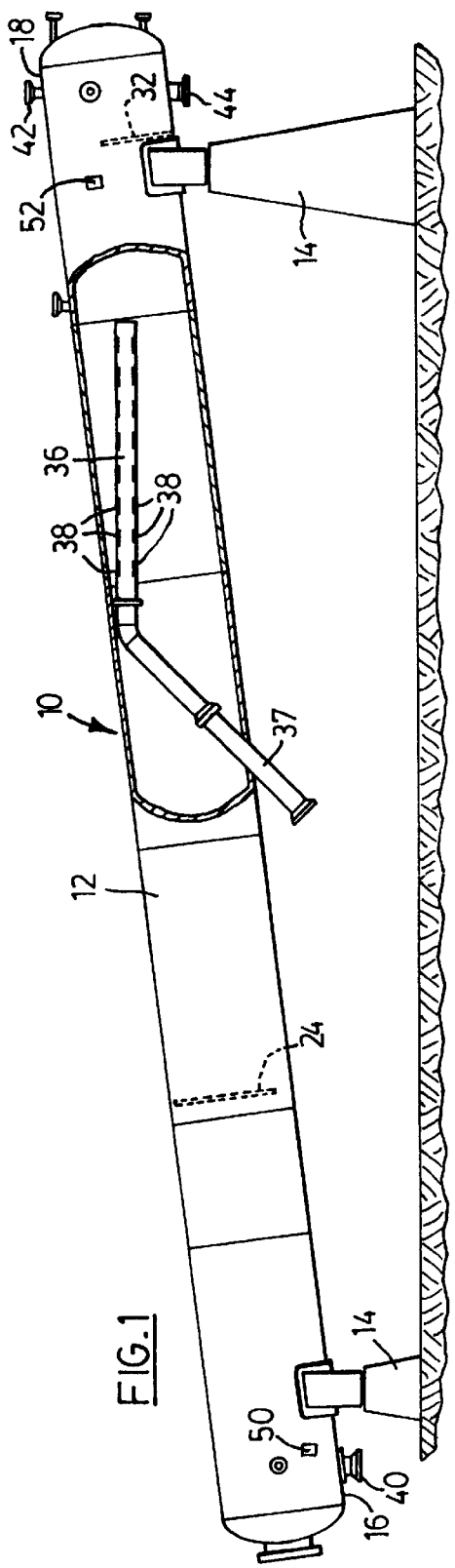
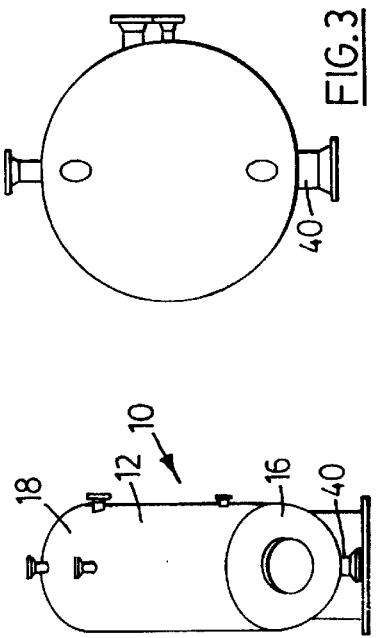
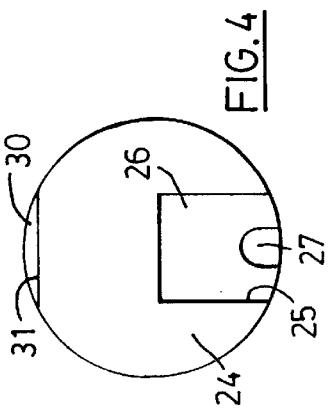
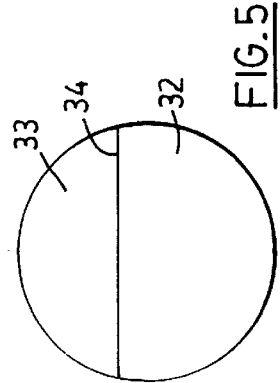
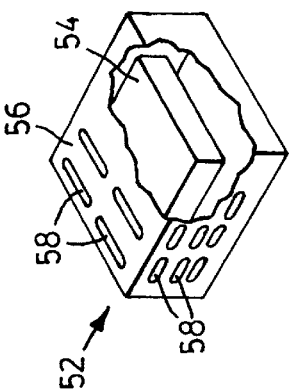

INCLINED SEPARATION TANK

FIELD OF THE INVENTION

This invention relates to pressure vessels, and in particular to vessels for use in separating oil well fluids, such as oil, water and gas. Such vessels are commonly referred to as a Free Water Knockout (FWKO).

BACKGROUND OF THE INVENTION

A large number of oil fields are underlain by large aquifers, which provide the drive mechanism to move the oil out of the reservoir. These fields continuously recycle water and some are waterflooded which introduces water from other formations. Viscosity differences between the gas, oil and water along with depletion greatly increase the amount of water that is produced with the oil. In older fields the amount of water produced may be 98% of the total fluids produced. In order to produce economically, the water has to be removed cheaply from the revenue generating fluids. Large volumes must be processed in order to make the process economical.

Factors in the separation of water from oil are: retention time, heat, chemicals, centrifugal forces and gravitational forces. Heat and chemicals are areas where little improvement can be made, and in addition they add to the operating cost. For this reason, conventional pressure vessels or Free Water Knockout vessels function by allowing the emulsion to sit in a relatively non-turbulent environment, allowing gravity to disengage the fluids from one another, which stratify into gas, oil and water. The water falls freely to the lower pan or bottom of the vessel and is removed therefrom. The oil and gas are withdrawn from higher locations in the vessel.

It will be appreciated that, the larger the pressure vessel, the more time is given to the emulsion to sit and stratify, and thus the more complete the separation becomes. If follows from this that, as the amount of emulsion to process becomes greater, larger and larger vessels must be used in order to allow the emulsion to sit for the stipulated amount of time before being withdrawn from the vessel.

Although large diameter vessels can increase retention time, they tend to be expensive and are usually limited to pressures less than 100 psi. Conventional FWKO's utilize a complicated system to monitor the oil-water interface, in order to determine when to dump the water and oil. The instrumentation to accomplish this is usually expensive to operate and complex.

Conventional pressure vessels of the kind under consideration fall into two broad categories: horizontal and vertical, each type having its own advantages. Vertical vessels are preferred for the separation of liquids, because the relatively small liquid interface within the vessel forces the liquids to stratify into deep, vertically separated bands from which the different liquids can be withdrawn. By comparison, a vessel that is oriented horizontally separates the fluids into shallow or narrower bands or layers which are more difficult to control. This fact might suggest that a vertically oriented vessel would be the best choice, however it turns out that the vertical separator is not a viable option, due to the fact that the height and weight of a unit capable of performing this operation would be enormous For example, a vertical vessel with the same capability as a typical vessel made in accordance with the present invention, would be about 65 feet high. For his reason, horizontal vessels tend to be used as FWKO vessels, with the various associated drawbacks mentioned earlier.

PRIOR ART

A prior patent of interest is Canadian patent 1,237,372, of May 31, 1988. This patent shows a conventional horizontal vessel construction which is utilized for separating oil and water received from a well, the vessel utilizing a skimming device to remove oil from which water has separated by gravity.

Another example of the prior art is seen in U.S. Pat. No. 2,206,835, of Jul. 2, 1940. In the arrangement disclosed in his patent, two tanks are used: an inclined tank to initially receive the fluid, operating in communication with a larger, vertically oriented tank. While the latter patent relies upon a second, vertical vessel to be in communication with an inclined tank in order to accomplish the separation, the vessel according to the present invention is a stand-alone unit, without moving mechanical parts, and without areas where solids can become trapped.

Another early Canadian patent is 197,859, of Mar. 9, 1992, which discloses a tank used for the separation of oil and water. The orientation of the tank is not fixed, and it moves to a certain extent against the tension of suspension springs. When water and oil accumulate in the tank in a quantity sufficient to over-balance the springs and weights, the free end of the tank moves downward so that the tank assumes a horizontal position. As a result, the actual separation process occurs with the vessel oriented horizontally.

Other examples of the prior an may be found in the following Canadian Patents:
  1,035,290 Jul. 25, 1978
  1,042,819 Nov. 21, 1978
Canadian Published applications:
  2,041,479 filed Apr. 30, 1991
  2,108,297 field Oct. 13, 1993.
Other U.S. issued Patents that are representative of the prior art are U.S. Pat. Nos. 5,326,474; 4,939,817; 4,120,796 and 4,132,651.

SUMMARY OF THE INVENTION

The Free Water Knockout vessel according to the present invention incorporates an advance wherein the vessel, which is essentially an elongate cylinder, is disposed obliquely to the horizontal. This obliquity provides certain improvements by comparison with a conventional horizontal vessel.

Firstly, the vessel in accordance with the present invention increases the effect of gravity on the separation process, forcing water into the lower portion of the vessel with greater force than occurs with a horizontal separator.

Secondly, the oblique disposition of the vessel results in deeper or wider liquid bands being developed, allowing both clean water and pure oil to be drawn off sooner than would be the case with a conventional horizontal vessel. This in turn allows the vessel according to the present invention to be smaller in diameter than an equivalent horizontal vessel known in the prior art. The small size of the vessel translates into a substantial cost saving, since the cost of the materials and labour required to build a larger diameter vessel increase very quickly with increasing diameter.

More particularly, this invention provides a free water knockout vessel for receiving and separating oil well fluids, said vessel comprising:

an elongate structure having a longitudinal axis disposed at an oblique angle to the horizontal, the structure having a lower end and an upper end,
  a lower head closing said lower end and an upper head closing said upper end, a plurality of spaced-apart baffle plates within the vessel, dividing the vessel into a plurality of interior compartments, an elongate inlet stratifier pipe within said vessel, the stratifier pipe having a longitudinal axis disposed substantially horizontally and being adapted to receive oil well fluids from a feed conduit and transmit them into said vessel, and exit means for withdrawing separated fluids from said vessel for further processing;

said plurality of baffle plates including:

A. a water baffle adjacent the lower end of said vessel, the water baffle having a manway opening in the lower region thereof, a manway panel adapted to close said manway opening but defining a water opening such that water may flow through the water opening into the lower end of said vessel, the water baffle having a weir opening adjacent the top thereof to allow oil trapped below the water baffle to escape into the higher region of the vessel, and B. an oil baffle located adjacent the upper end of the vessel to provide a barrier to water, the oil baffle including a weir opening adjacent the top thereof, to allow oil to flow over the top of the oil baffle.

In addition, this invention provides a method of separating oil well fluids, comprising: providing a free water knockout vessel for receiving and separating oil well fluids, the vessel being in the form of an elongate structure with a longitudinal axis disposed at an oblique angle to the horizontal, the structure having closed lower and upper ends, and a plurality of spaced-apart baffle plates within the vessel, dividing the vessel into a plurality of interior compartments, one of said baffle plates being a water baffle adjacent the lower end of said vessel, the water baffle having a manway opening in the lower region thereof, a manway panel adapted to close said manway opening but defining a water opening, the water baffle further having a weir opening adjacent the top thereof, another one of said baffle plates being an oil baffle located adjacent the upper end of the vessel to provide a barrier to water, the oil baffle including a weir opening adjacent the top thereof, transmitting oil well fluids into said vessel by passing them through a feed conduit connected to the upstream end of an elongate inlet stratifier pipe within said vessel, the stratifier pipe having a longitudinal axis disposed substantially horizontally and having spaced apart perforations through which said oil well fluids pass, and withdrawing each separated fluid from said vessel through its own exit coupling, for further processing;

said step of withdrawing including allowing water to flow through the water opening into the lower end of said vessel, the step of withdrawing further including allowing oil trapped below the water baffle to escape into the higher region of the vessel by flowing over the weir opening of the water baffle, and in which said step of withdrawing includes allowing oil to flow over the top of the oil baffle.

BRIEF DESCRIPTION OF THE DRAWINGS

One embodiment of the present invention is illustrated in the accompanying drawings, in which like numerals denote like parts throughout the several views, and in which:

FIG. 1 is a side elevation of an example of the present invention;

FIG. 2 is an end elevation of the arrangement in FIG. 1;

FIG. 3 is a further end view illustrating the nozzle orientation of the vessel;

FIG. 4 is an elevation view of the lower baffle plate;

FIG. 5 is an elevation view of the upper baffle plate;

FIG. 6 is a partly broken-away perspective view of a float housing; and

FIG. 7 is an end view of one of the internal components of the vessel of the present invention.

DETAILED DESCRIPTION OF THE DRAWINGS

The person skilled in the art would generally agree that the ideal FWKO will have the following characteristics:
1) Cheap to construct,
2) Provides water quality that can be directly reinjected.
3) Eliminates agitation in the vessel from gas slugs.
4) Minimizes the vessel volume used for gas.
5) Operation should be simple and cheap.
6) Operates at pressures up to at least 250 psi.
7) Ability to be installed on a pipeline, thus elating costly line looping.
8) Provides ample gas pressure so that gas compression can be eliminated.
9) Utilizes existing pipeline stratification of the oil and water.
10) Operates over a wide range of volumes and conditions with no design changes.
11) Separates gas from the emulsion.
12) Reduces $H_2S$ concentrations in the gas stream.
13) Reduces future downstream equipment costs.

As seen in FIG. 1, a vessel constructed in accordance with one embodiment of the present invention (an FWKO vessel) is illustrated generally at 10 and is configured to define an elongate structure 12 which is mounted on pilings 14 in such a way that its longitudinal axis is disposed at an oblique angle to the horizontal. Due to the sloping disposition, the vessel has a lower end 16 and an upper end 18, with rounded heads 20 and 22 respectively closing the lower end 16 and upper end 18. In the specific vessel embodiment illustrated in FIG. 1, the inclination is approximately 7° from the horizontal, although departures from this particular angle are contemplated within the scope of this invention.

The vessel includes a cylindrical shell which may typically be about 55 inches in diameter and approximately 54 feet in length. These dimensions and angles are given only by way of typical example, and are not to be regarded as limiting in terms of the scope of the present invention.

In this connection, the length of the vessel and the angle of elevation were selected in such away as to maximize the angle and still utilize a workable height at the highest part of the vessel.

A further consideration in connection with the tilt or obliquity of the vessel is the volume occupied by gas. In order to minimize this volume, the vessel must be tilted or angled. The greater the angle formed between the vessel and the horizontal plane, the smaller the emulsion/gas interface would become. Another benefit of providing the tilt is that the distance from the liquid/gas interface to the gas outlet nozzle can be maximized to reduce fluid carryover and yet still minimize the volume set aside for gas containment.

Generally, the shell of the vessel should be sized to keep the fluid moving in laminar flow at all times, as it moves toward the outlet. In laminar flow, the velocity of the fluid is at its maximum at the vessel axis, and decreases sharply to zero at the wall. As oil particles move away from the vessel axis, they travel into an area where the forces are so small that there is no tendency for the oil to recombine with the water. Once the oil reaches the top of the vessel, there are no forces moving the oil. However, tilting the vessel allows gravity to move the oil toward the emulsion outlet. Thus, the tilting of Me vessel prevents a build-up of oil from occurring, which keeps the oil further away from the higher velocities at the vessel axis. The simplest way to look at the effect of tilting the vessel is to visualize the top of the vessel as a trap. Once oil enters his trap, there is no effective force to get the oil back into the water. The tilt of the vessel allows gravity to carry the oil back to the emulsion outlet.

Each design situation may change the configuration of the vessel. The length and diameter of the vessel, along with the tilt, can be optimized in order to reduce the overall cost. If the tilt is increased, it may allow a reduction in the diameter and length of the vessel, but it may increase the cost of supporting the vessel.

Referring now to FIGS. 1, 4 and 5, the vessel further incorporates a water baffle 24, located closer to the lower end 16 than to the upper end 18 of the vessel 10. The water baffle 24 has a substantially rectangular manway opening 25 with a manway panel 26 adapted to close the opening 25, the panel 26 having a water opening 27 in the bottom region thereof, allowing water to flow through the water opening 27. The water baffle 24 further has a weir opening 30 defined between a horizontal top edge or weir 31 and the upper inside wall of the vessel 10. This weir opening 30 allows oil trapped below the water baffle 24 to escape into the higher region of the vessel 10.

Also provided, as seen in FIG. 5, is an oil baffle 32 which is located closer to the upper end 18 of the vessel 10 than to the lower end 16 thereof. The oil baffle 32 provides a barrier to water, and includes a weir opening 33 adjacent the top thereof, to allow oil to flow over the top of the oil baffle 32. The weir opening is defined between an upper weir edge 34 and the adjacent upper inside surface of the vessel 10.

Provided within the upper half of the vessel 10 is an elongate inlet stratifier pipe 36, the stratifier pipe having a longitudinal axis disposed substantially horizontally and being adapted to transmit oil well fluids generally into the top third of the vessel 10. An inlet pipe 37 feeds the emulsion of oil well fluids to the leftward (upstream) end of the stratifier pipe 36. The stratifier pipe 36 is provided with upper and lower perforations 38, the perforations being of a size and distribution so as to partially block the flow of oil well fluids into the vessel 10, thus allowing water to fall out of the lower perforations and oil to exit through the upper perforations, thus resulting in a reduction of subsequently required separation. Also, in the embodiment illustrated, the downstream end of the stratifier pipe 36 is partially closed by a semicircular panel 39 as seen in FIG. 7.

The lower end 16 of the vessel 10 is provided with a water drain coupling 40, while the upper end of the vessel 10 is provided with a gas exit coupling 42 and an oil exit coupling 44.

The stratifier pipe provided by the present invention is designed to minimize the effect of gas slugs, because these enter the vessel 10 close to the top of the vessel in the already dewatered emulsion.

Essentially, the illustrated stratifier pipe 36 is a pipe wit elongate slots 38 cut out along the top surface and bottom surface, with the total area of the slots being determined by the velocity of fluid movement required in the stratifier pipe. Thus, due stratifier pipe slot size is ideally designed specifically for each particular application.

The structure just described allows high velocity gas slugs to go directly out the downstream end of the stratifier pipe, thus minimizing agitation of the other fluids. Gas emerging from the downstream end of the stratifier pipe has only a short distance to travel to reach the top of the vessel 10. If agitation does occur, it will be in the emulsion leaving the vessel. However, a slight water increase in the emulsion at this location is of no concern. The primary objective is to get clean water out of the water outlet pipe.

The oil baffle 32 at the top of the vessel, functioning as a weir, skims off the cleanest emulsion from the highest liquid point in the vessel. Near this weir is a float control, represented schematically by the box 52, which can operate to maintain the liquid/gas interface in the vessel at a desired level.

The bottom two-thirds of the vessel 10 functions to clean the water up to the point of injection quality. It is considered that the secret of obtaining the required water quality is the inclination of the vessel 10, which maximizes the height between the emulsion/water interface and the water outlet. Any oil entrained in the water does not have to travel far before it reaches the top wall of the vessel. As the top wall and the bottom wall of the vessel tend to be the quietest areas in the vessel, fluid in these areas is not affected by any disturbance.

The water baffle 24, which is located in the bottom third of the vessel 10, forces all the water to the bottom of the vessel and creates a dead spot in front of the baffle. This baffle functions primarily to increase the retention time of the fluid before entering the water outlet, thus forcing the cleanest water into the water outlet. As previously mentioned, an opening is provided between the water baffle 24 and the top of the vessel, to allow oil that may settle out below the water baffle to migrate back to the oil/emulsion outlet.

OPTIONAL ACCESSORIES

In the event that the emulsion outlet 44 becomes restricted or blocked, a capacitance probe can be installed just above the water outlet 40. Such a capacitance probe is represented in FIG. 1 by the box 50. The capacitance probe reacts to the presence of oil, whereby if oil is detected, the water disposal pump connected to the water outlet 40 can be shut down. Alternatively, a control valve (not illustrated) can be closed.

A further option is the installation of a float control 52, already mentioned. In FIG. 6, a float 54 is located within a housing 56 which has a plurality of apertures 58 that restrain and slow down the entry and exit of fluid in and out of the housing. This prevents false signals due to gas slugs or other sources of turbulence. If gas conservation is required, the float 54 will control a valve on the gas outlet 42 (not shown). When the liquid level goes down, the float will open the valve and allow some gas to escape, which in turn raises the liquid level. When the proper level is reached, the valve will close. If gas conservation is not required, the gas can exit from the vessel along with emulsion, and no control valve or float mechanism will be required. The utilization of higher vessel pressures can elate the high cost of gas compression, and the gas can be put directly into a pipe line system.

Various nozzles and flanges are positioned along the vessel for sampling purposes, or as advance provisions for further concepts not yet filly developed.

The operation of the vessel is easy to learn. The only control is a switch for the disposal pump at the water outlet 40. This pump is either on or off. For example, a particular design might require that a vessel be able to accommodate 2500 $M^3/D$ of fluid. Theory may reveal that the vessel can remove 1500 $M^3/D$ of injectable quality water. In this situation, a pump designed to inject 1500 $M^3/D$ of water would be installed at the water outlet line, and would run at this continuous rate. The excess 1000 M³/D of emulsion is carried out the emulsion outlet to a further oil treating step. A rate control valve can be substituted for the pump if the water is not required for direct reinjection.

While one embodiment of this invention has been illustrated in the accompanying drawings and described hereinabove, it will be evident to those skilled in the art that changes and modifications may be made therein, without departing from the essence of this invention, as set forth in the appended claims.

The embodiments of the invention in which an exclusive property or privilege is claimed are defined as follows:

1. A free water knockout vessel for receiving and separating oil well fluids, said vessel comprising:

an elongate structure having a longitudinal axis disposed at an oblique angle to the horizontal, the structure having a lower end and an upper end, a lower head closing said lower end and an upper head closing said upper end, a plurality of spaced-apart baffle plates within the vessel, dividing the vessel into a plurality of interior compartments, an elongate inlet stratifier pipe within said vessel, the stratifier pipe having a longitudinal axis disposed substantially horizontally and being adapted to receive oil well fluids from a feed conduit and transmit them into said vessel, and exit means for withdrawing separated fluids from said vessel for further processing;

said plurality of baffle plates including:

A. a water baffle adjacent the lower end of said vessel the water baffle having a manway opening in the lower region thereof, a manway panel adapted to close said manway opening but defining a water opening such that water may flow through the water opening into the lower end of said vessel, the water baffle having a weir opening adjacent the top thereof to allow oil trapped below the water baffle to escape into the higher region of the vessel, and B. an oil baffle located adjacent the upper end of the vessel to provide a barrier to water, the oil baffle including a weir opening adjacent the top thereof, to allow oil to flow over the top of the oil baffle.

2. A vessel as claimed in claim 1, in which the elongate structure is substantially cylindrical, in which the water opening is adjacent to the bottom of said manway panel, and in which the elongate inlet stratifier pipe has upper and lower perforations which are of a size and distribution so as to partially block the flow of oil well fluids into the vessel, thus allowing water to fall out of the lower perforations and oil to exit through the upper perforations, thus resulting in reduced separation being required.

3. A vessel as claimed in claim 1 in which the downstream end of the stratifier pipe is partially closed, and in which the feed conduit connects to the upstream end of the stratifier pipe through an obtuse angle in order to minimise the creation at turbulence at the connection.

4. A method of separating oil well fluids, comprising:

providing a free water knockout vessel for receiving and separating oil well fluids, the vessel being in the form of an elongate structure with a longitudinal axis disposed at an oblique angle to the horizontal, the structure having closed lower and upper ends, and a plurality of spaced-apart baffle plates within the vessel, dividing the vessel into a plurality of interior compartments, one of said baffle plates being a water baffle adjacent the lower end of said vessel, the water baffle having a manway opening in the lower region thereof, a manway panel adapted to close said manway opening but defining a water opening, the water baffle further having a weir opening adjacent the top thereof, another one of said baffle plates being an oil baffle located adjacent the upper end of the vessel to provide a barrier to water, the oil baffle including a weir opening adjacent the top thereof, transmitting oil well fluids into said vessel by passing them through a feed conduit connected to the upstream end of an elongate inlet stratifier pipe within said vessel, the stratifier pipe having a longitudinal axis disposed substantially horizontally and having spaced apart perforations through which said oil well fluids pass, and withdrawing each separated fluid from said vessel through its own exit coupling, for further processing;

said step of withdrawing including allowing water to flow through the water opening into the lower end of said vessel, the step of withdrawing further including allowing oil trapped below the water baffle to escape into the higher region of the vessel by flowing over the weir opening of the water baffle, and in which said step of withdrawing includes allowing oil to flow over the top of the oil baffle.

5. A method as claimed in claim 1, in which the elongate structure is substantially cylindrical in which the water opening is adjacent the bottom of the manway panel, and in which the elongate inlet stratifier pipe has upper and lower perforations which are of a size and distribution so as to partially block the flow of oil well fluids into the vessel, wherein the step of transmitting includes allowing water to fall out of the lower perforations and oil to exit through the upper perforations, thus resulting in reduced separation being required.

6. A method as claimed in claim claim 5 or 4, in which the step of transmitting is carried out with a minimum of turbulence being created at the join between the feed conduit and the stratifier pipe, by providing an oblique connection between the feed conduit and the stratifier pipe.

* * * * *